Aug. 14, 1928.
E. COURTIN
1,680,728
REGULATING SYSTEM
Filed June 10, 1927
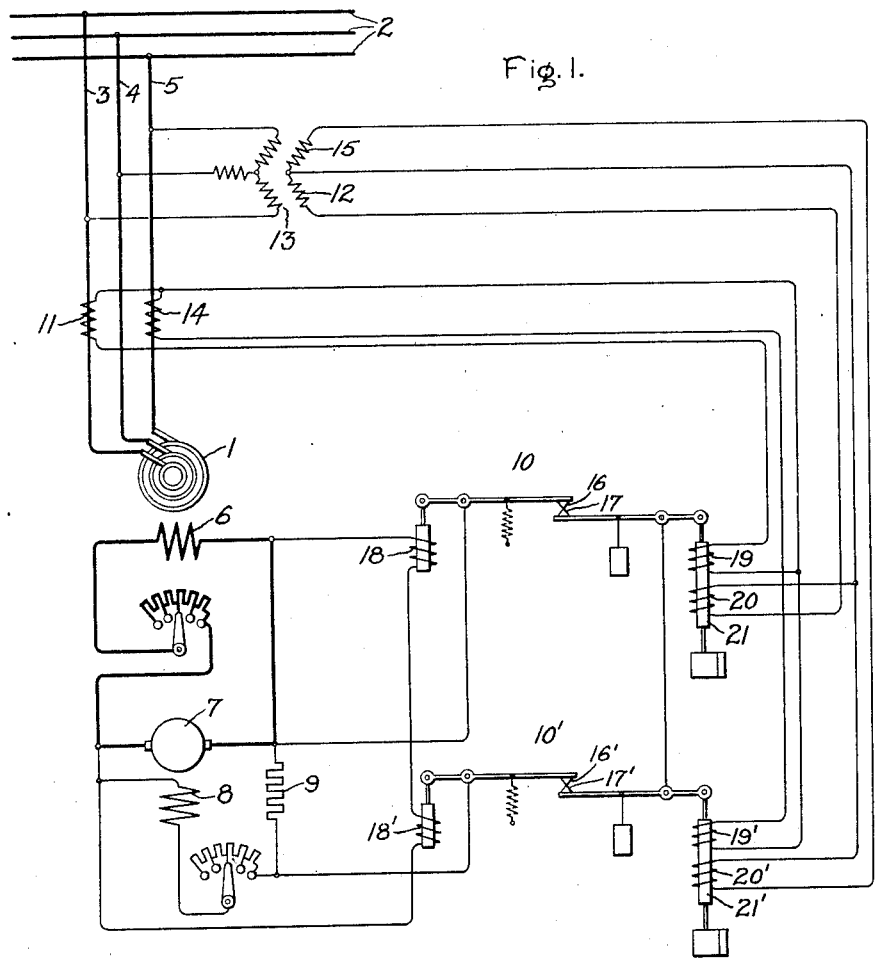
Fig.1.
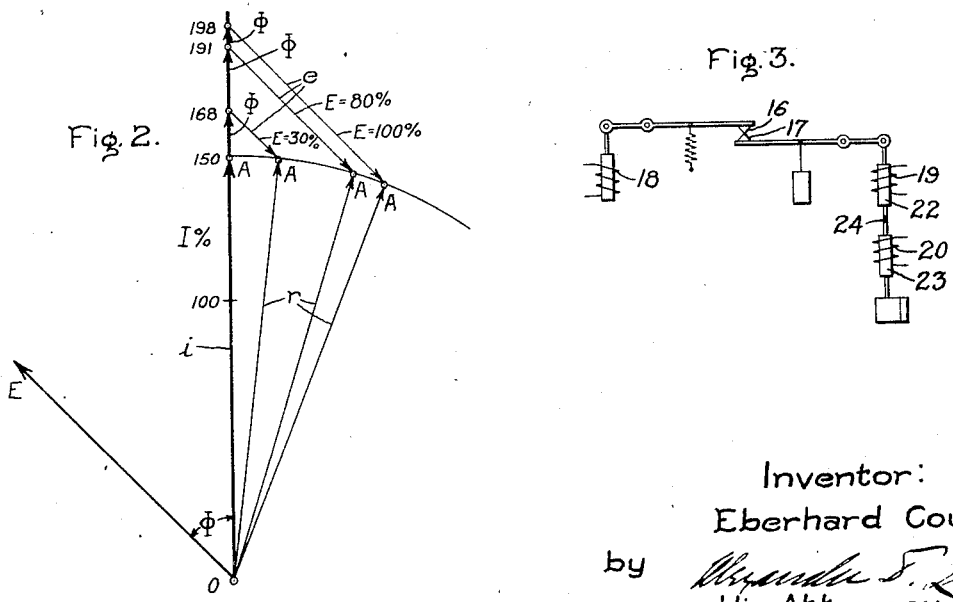
Fig.2.
Fig.3.
Inventor:
Eberhard Courtin,
by
His Attorney.

Patented Aug. 14, 1928.

1,680,728

UNITED STATES PATENT OFFICE.

EBERHARD COURTIN, OF BERLIN, GERMANY, ASSIGNOR TO GENERAL ELECTRIC COMPANY, A CORPORATION OF NEW YORK.

REGULATING SYSTEM.

Application filed June 10, 1927, Serial No. 197,981, and in Germany July 5, 1926.

My invention relates to regulating systems for controlling a characteristic of the output of a dynamo-electric machine and more particularly to a system in which an electrical characteristic of a generator such as the current is controlled by varying the excitation of an exciter which supplies exciting current to the generator.

My invention is of particular utility in systems for limiting the current of the generator on overloads and short circuits. Various regulating arrangements have been proposed and used which automatically prevent the current delivered by the generator from exceeding a predetermined amount and by this means both the generator and system are protected against damage resulting from sustained short circuit current. Such methods, however, have limited application. In the case of a short circuit the load is reduced in proportion to the decrease in excitation on the generator. In the case of overloads, however, this condition is only obtained in case the greater portion of the load connected to the system comprises an ohmic resistance load such for example as incandescent lamps, heating devices, etc. If the greater percentage of the load comprises translating devices which consume a greater current with a decrease in voltage, such as constant torque motors, a decrease in generator voltage will not decrease the current supplied by the generator but on the other hand will increase the current.

An object of my invention is to provide in a regulating system a new and improved arrangement for limiting the current of a generator during short circuit conditions and to limit also the current of the generator to different predetermined values during overload conditions depending upon the value of generator voltage.

My invention will be better understood from the following description taken in connection with the accompanying drawing, and its scope will be pointed out in the appended claims.

In the accompanying drawing, Fig. 1 is a diagrammatic view of a regulating system showing one embodiment of my invention, Fig. 2 is an explanatory diagram showing the vector relations between the current and voltage of the regulating coils under different conditions of energization, and Fig. 3 is a diagrammatic illustration of a modification of the regulator shown in Fig. 1.

Referring to Fig. 1 of the drawing, 1 represents a generator which is to be regulated. As shown, the generator 1 is an alternator which is connected to an alternating current load circuit 2 by means of conductors 3, 4 and 5. It is to be understood, however, that my invention is not limited to alternating current circuits but is equally well adapted for application in direct current systems. The alternator 1 is provided with a field winding 6 which is excited by a suitable source of current shown as an exciter 7. The exciter 7 is provided with a shunt field winding 8 and a resistance 9 in series therewith which is arranged to be short-circuited by the operation of vibratory regulators 10 and 10' of the Tirrill type. Regulator 10 is connected to be responsive to the current and voltage conditions of phase 3—4 from the secondary winding 11 of a current transformer associated with conductor 3 and the secondary winding 12 of a potential transformer 13. The regulator 10' is connected to be responsive to the current and voltage conditions of phase 4—5 from the secondary winding 14 of current transformer associated with conductor 5 and the secondary winding 15 of potential transformer 13.

The regulator 10, as shown, is of well known construction comprising two cooperating contacts 16 and 17. Contact 16 is arranged to be actuated by a direct current magnet 18 connected across the exciter 7 and contact 17 is arranged to be actuated by an alternating current magnet 19 excited from current transformer winding 11 and an alternating voltage magnet 20 excited from potential transformer winding 12. These last mentioned coils 19 and 20 are placed on the same core 21 and arranged to operate differentially. For simplicity of illustration, the contacts 16 and 17 are shown as operating directly across the resistor 9, but the use of the well known intermediate relay which is controlled by these primary contacts no doubt will be found more desirable in practice.

In a similar manner, regulator 10' comprises two cooperating contacts 16' and 17' actuated respectively by a direct current magnet 18' connected in series with direct current magnet 18 and two alternating current magnets 19′ and 20′ energized respectively from the current transformer secondary winding 14 and the potential transformer secondary winding 15. These last mentioned coils 19′ and 20′ are placed on the same core 21′ and arranged to operate differentially.

The regulation effected from the cooperation of the coils 19 and 20, and 19′ and 20′, will be explained in detail with the aid of the vector diagram shown in Fig. 2. In the diagram, it is assumed that the current I, for example, of phase 3—4 lags the corresponding phase voltage E by an angle of 45°; that is, the power factor is assumed to be .7. Let the vector $i$ represent the ampere turns from the current winding 19, the vector $e$ the ampere turns from the voltage winding 20, and the vector $r$ the resultant ampere turns for actuating the contact 17. In order to make the regulator respond, the vector $r$ must reach the value OA. If, for example, the voltage $e$ is equal to zero, then only the ampere turns $i$ are effective. Let it be assumed that this corresponds to a value of I which is equal to 150 per cent of full load current. The regulator will then limit the excess current to 50 per cent of the normal generator rating. If voltage $e$ exists across the generator terminals, then the current $i$ must become higher with increasing voltage in order that the vector $r$ may reach the value OA. In the diagram, various assumed conditions are shown. If, for example, the voltage $e$ amounts to 30 per cent of the normal generator voltage, the regulator limits the current to 168 per cent. With $e$ equal to 80 per cent, it limits the generator current to 191 per cent, and, if $e$ equals 100 per cent, it limits the generator current to 198 per cent.

It is to be understood, however, that the foregoing specific values assigned to the vectors $e$ and $i$ are values chosen for purposes of explanation, but it will be apparent that by a suitable proportioning of the ampere turns of the current and voltage windings 19 and 20, and likewise 19′ and 20′, it will be possible to obtain various conditions of regulation between zero and 100 per cent voltage. It will also be apparent that the regulation will be obtained in accordance with the phase displacement between the current and voltage either during short circuit or overload condition since the coils have a common magnetic circuit.

From the foregoing description it will be observed that the regulating system herein disclosed will provide protection by limiting the current of the generator to a predetermined amount during short circuit conditions and will also provide protection by limiting the current to different predetermined values in accordance with the voltage which is maintained upon the load circuit during overload conditions when the current demand increases with decrease in generator voltage.

If it is desirable to arrange the regulators so that the operation is independent of phase displacement, the two coils 19 and 20, and similarly 19′ and 20′, may be arranged to be magnetically independent of one another by arranging each coil on a separate core. This arrangement is shown in Fig. 3. For simplicity of illustration, I have simply shown a portion of the system shown in Fig. 1, but the manner in which the actuating coils are connected will be evident since like numerals have been used for the various coils and component parts of the regulator. In this modification the only essential difference is the arrangement of the alternating core member which is shown as comprising a core 22 for coil 19 and a core 23 for coil 20. These cores are magnetically separated but mechanically connected by the rod 24 and will permit the force exerted by coil 19 to act against the force excited by coil 20 so that the resultant force will actuate the contact 17 in a manner similar to the arrangement shown in Fig. 1.

While I have shown and described a particular embodiment of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a generator, an excitation circuit therefor, and means responsive to the voltage and current of said generator for varying the energization of said excitation circuit to limit the generator current during abnormal conditions of generator operation to different predetermined values of current above the normal rated value for different predetermined values of generator voltage.

2. In combination, a generator, an excitation circuit therefor, and means responsive to the voltage and current of said generator for varying the energization of said excitation circuit to limit the current output of said generator during short circuit conditions to a predetermined value and to limit said current output to other predetermined values during overload conditions in accordance with predetermined values of generator voltage.

3. In combination, a generator, an excitation circuit therefor, and regulating means comprising opposed coils responsive to the voltage and current of said generator for varying the energization of said excitation circuit to limit the current output of said generator to a predetermined minimum value under short circuit conditions and to limit the current output to different predetermined values of current when the current demand upon said generator tends to increase with decreasing generator voltage.

4. In a regulating system, a dynamo-electric machine, an excitation circuit therefor, cooperating contacts arranged to control by their engagement and disengagement an electrical characteristic of said excitation circuit, and means responsive to the current and voltage of said dynamo-electric machine for controlling the operation of one of said contacts to maintain different predetermined values of current above a predetermined normal value in accordance with the voltage of said generator.

5. In a regulating system, an alternating current machine, an exciter therefor, a pair of cooperating contacts arranged to control by their engagement and disengagement the excitation of said exciter, a magnet operative in response to the voltage of said exciter for actuating one of said contacts, and a magnet comprising opposed coils responsive respectively to the voltage and current of said alternating current machine for limiting the current output of said machine in accordance with the value of said machine voltage during abnormal conditions of operation.

6. In a regulating system, a polyphase alternating current machine, an exciter therefor, a plurality of regulating means each comprising a contact for varying the excitation of said exciter, a magnet responsive to an electrical characteristic of one phase of said alternating current machine for controlling a contact of one of said regulating means, and a magnet comprising coils responsive to an electrical characteristic of another phase of said alternating current machine for controlling the contact of another of said regulating means.

7. In a regulating system, a polyphase alternating current machine, an exciter therefor, regulating means having a plurality of contacts connected in series for varying the excitation of said exciter, a magnet comprising coils responsive to the voltage and current of one phase of said alternating current machine for controlling one of said contacts, and a magnet comprising coils responsive to the voltage and current of another phase of said alternating current machine for controlling another of said contacts.

8. In a regulating system, a polyphase alternating current machine, an exciter therefor, a plurality of pairs of cooperating contacts connected in series and arranged to control by their engagement and disengagement the excitation of said exciter, one contact of each of said pairs of contacts being arranged to be operated in response to the voltage of said exciter, a magnet comprising differentially acting coils responsive to the voltage and current of one phase of said alternating current machine for controlling a contact associated with one of said first mentioned contacts, and a magnet comprising differentially acting coils responsive to the voltage and current of another phase of said alternating current machine for controlling a contact associated with another of said first mentioned contacts.

In witness whereof, I have hereunto set my hand this 24th day of May, 1927.

EBERHARD COURTIN.